US012351927B1

(12) United States Patent
Wu et al.

(10) Patent No.: US 12,351,927 B1
(45) Date of Patent: Jul. 8, 2025

(54) FORMING DEVICE AND PREPARATION METHOD OF GRAPHITE CRUCIBLE

(71) Applicants: Sichuan Jinhuineng New Materials co., Ltd, Chengdu (CN); Chongqing Jinhuineng New Materials co., Ltd, Chongqing (CN)

(72) Inventors: Zeyi Wu, Chengdu (CN); Yaping Wu, Chengdu (CN); Shixin Cao, Chengdu (CN); Shaopeng Wang, Chengdu (CN); Jinsheng Guo, Chengdu (CN)

(73) Assignees: Sichuan Jinhuineng New Materials co., Ltd, Chengdu (CN); Chongqing Jinhuineng New Materials co., Ltd, Chongqing (CN)

( * ) Notice: Subject to any disclaimer, the term of this patent is extended or adjusted under 35 U.S.C. 154(b) by 0 days.

(21) Appl. No.: 19/031,140

(22) Filed: Jan. 17, 2025

Related U.S. Application Data

(63) Continuation of application No. PCT/CN2024/091711, filed on May 8, 2024.

(30) Foreign Application Priority Data

Feb. 26, 2024   (CN) .......................... 202410206401.6

(51) Int. Cl.
*B29C 43/00* (2006.01)
*B28B 3/02* (2006.01)
(Continued)

(52) U.S. Cl.
CPC ................. *C25D 1/02* (2013.01); *B28B 3/02* (2013.01); *B28B 17/00* (2013.01); *B29C 43/00* (2013.01);
(Continued)

(58) Field of Classification Search
CPC ..................... B29C 43/006; B29C 2043/029
See application file for complete search history.

(56) References Cited

U.S. PATENT DOCUMENTS 3,208,104 A * 9/1965 Hessel .................. B29C 51/002
425/389
6,083,339 A * 7/2000 Peters ................... B29C 67/243
264/154

FOREIGN PATENT DOCUMENTS

CN    108527619    *  9/2018
CN    212279917    *  8/2020
(Continued)

OTHER PUBLICATIONS

International Searching Authority (CNIPA), Written Opinion for PCT/CN2024/091711, Nov. 21, 2024.
Claims of PCT/CN2024/091711, May 8, 2024.

*Primary Examiner* — Edmund H Lee
(74) *Attorney, Agent, or Firm* — Hemisphere Law, PLLC; Zhigang Ma

(57) ABSTRACT

A forming device and a preparation method of a graphite crucible are provided. The forming device includes: a support frame, including a base; a male die, disposed on the support frame and far away from the base and movable reciprocally in a vertical direction relative to the support frame; a crucible mouth pressing member, disposed on the support frame, correspondingly disposed on a side of the male die close to the base, movable reciprocally in the vertical direction relative to the support frame, and defining an opening part allowing the male die to pass therethrough; and a female die, disposed on the base and corresponding to the male die, and configured to accommodate crucible paste. The male die, the crucible mouth pressing member and the female die are configured to cooperatively form the crucible paste into the graphite crucible.

9 Claims, 13 Drawing Sheets

(51) Int. Cl.
  *B28B 17/00* (2006.01)
  *C25D 1/02* (2006.01)
  *C25D 17/12* (2006.01)
  *C25D 21/02* (2006.01)
  *B29C 43/02* (2006.01)
(52) U.S. Cl.
  CPC ............ *B29C 43/006* (2013.01); *C25D 17/12* (2013.01); *C25D 21/02* (2013.01); *B29C 2043/029* (2013.01)

(56) References Cited

FOREIGN PATENT DOCUMENTS

| | | | |
|---|---|---|---|
| CN | 219466769 | * | 8/2023 |
| CN | 116674061 A | | 9/2023 |
| CN | 220297926 | * | 1/2024 |

* cited by examiner

Moving the male die and the crucible mouth pressing member towards the female die synchronously to thereby squeeze the crucible paste, so that the crucible paste is subjected to constant pressure for a preset duration — S21

Continuing to move the male die in a direction towards the base, and synchronously moving the crucible mouth pressing member in a direction away from the base, to thereby form the graphite crucible — S22

FIG. 9

Moving the male die and the crucible mouth pressing member towards the female die synchronously to thereby contact the crucible paste — S211

Continuing to move the male die and the crucible mouth pressing member in the direction towards the base synchronously, and gradually increasing pressure on the male die and the crucible mouth pressing member to setting pressure — S212

Keeping the pressure of the male die and the crucible mouth pressing member applied on the crucible paste at the setting pressure for the preset duration, so that the crucible paste is subjected to constant pressure — S213

FIG. 10

Gradually increasing pressure of the male die, and moving the male die in the direction towards the base to a first limiting position; wherein the first limiting position is configured to limit a thickness of a bottom of the graphite crucible — S221

Gradually reducing pressure of the crucible mouth pressing member, and synchronously moving the crucible mouth pressing member in the direction away from the base to a second limiting position; wherein the second limiting position is higher than a reference height of the graphite crucible — S222

FIG. 11

```
┌─────────────────────────────────────────────────────────────────┐
│ Moving the male die and the crucible mouth pressing member towards the │
│ female die synchronously to thereby squeeze the crucible paste, so that the │ ─── S21
│ crucible paste is subjected to constant pressure for a preset duration │
└─────────────────────────────────────────────────────────────────┘
                                  ▼
┌─────────────────────────────────────────────────────────────────┐
│ Continuing to move the male die in a direction towards the base, and │
│ synchronously moving the crucible mouth pressing member in a direction │ ─── S22
│ away from the base, to thereby form the graphite crucible │
└─────────────────────────────────────────────────────────────────┘
                                  ▼
┌─────────────────────────────────────────────────────────────────┐
│ Keeping a position of the male die unchanged, increasing the pressure of │
│ the crucible mouth pressing member, and slowly moving the crucible │
│ mouth pressing member down to a third limiting position; wherein the third │ ─── S23
│ limiting position is configured to limit the reference height of the graphite │
│ crucible │
└─────────────────────────────────────────────────────────────────┘
                                  ▼
┌─────────────────────────────────────────────────────────────────┐
│ Keeping the pressure of the male die and the crucible mouth pressing │
│ member applied on the crucible paste unchanged for the preset duration to │ ─── S24
│ thereby form a crucible mouth │
└─────────────────────────────────────────────────────────────────┘
```

FIG. 12

```
┌─────────────────────────────────────────────────────────────────┐
│ Releasing the pressure of the male die and the crucible mouth pressing │ ─── S31
│ member applied on the crucible paste synchronously │
└─────────────────────────────────────────────────────────────────┘
                                  ▼
┌─────────────────────────────────────────────────────────────────┐
│ Keeping a position of the crucible mouth pressing member unchanged, and │
│ moving the male die along the direction away from the female die to an │ ─── S32
│ initial position of the male die │
└─────────────────────────────────────────────────────────────────┘
                                  ▼
┌─────────────────────────────────────────────────────────────────┐
│ Moving the crucible mouth pressing member along the direction away │
│ from the female die to an initial position of the crucible mouth pressing │ ─── S33
│ member │
└─────────────────────────────────────────────────────────────────┘
```

FIG. 13

FORMING DEVICE AND PREPARATION METHOD OF GRAPHITE CRUCIBLE

CROSS-REFERENCE TO RELATED APPLICATIONS

This application is a continuation of International Patent Application No. PCT/CN2024/091711, filed on May 8, 2024, which claims the priority of Chinese Patent Application No. CN202410206401.6, filed on Feb. 26, 2024, both of which are herein incorporated by references in their entirety.

TECHNICAL FIELD

The disclosure relates to the field of graphite crucible preparation technologies, and more particularly to a forming device and a preparation method of a graphite crucible.

BACKGROUND

With the widespread application of lithium-ion batteries in electric vehicles and energy storage, the lithium battery industry continues to develop at a high speed, which places higher requirements on the cost and performance of negative electrode materials. Therefore, how to further reduce the manufacturing cost of the negative electrode materials is a direction for continuous improvement for the graphite industry to adapt to the development of lithium-ion battery industry. Acheson graphitization furnace has characteristics of strong product adaptability, mature technology and high safety, and is widely used in the graphitization of graphite negative electrode materials for the lithium-ion batteries.

Graphite crucible is one of main consumables of the Acheson graphitization furnace, its cycle usage times play a crucial role for reducing the graphitization cost of the graphite negative electrode materials for lithium-ion batteries, especially as the Acheson graphitization furnace has been greatly increased to 150-200 tons/furnace and the energy consumption per unit product has been greatly reduced, the cycle usage times of the graphite crucible are even more important. A graphite crucible with a loading capacity of 200 kilograms per crucible (kg/crucible) is taken as an example, a unit price of the graphite crucible is 2,000 CNY/piece, and 5 crucibles are required to load one ton. An average cycle usage time of a mainstream product of the crucible in the market is about 4 times, thus about 1.25 crucibles are required for each ton of the negative electrode materials, and the crucible cost per ton of the negative electrode materials is about 2,500 CNY. If the cycle usage times of the graphite crucible can be increased to 6 times, the crucible cost per ton of the negative electrode materials will be about 1,667 CNY, and the cost per ton of the negative electrode materials can be saved by 833 CNY.

The crucible paste is subjected to a pressure of the male die and freely turns up along a gap between the male die and the female die until a main cylinder moves to a setting displacement when the graphite crucible forming machine and its forming process in the related art form the crucible. Since an upper surface of the crucible paste is in a disordered and free turning up state during the turning up process, there is no pressure above the paste, resulting in a low overall density of the crucible, and the density of the crucible decreases from bottom to top, for example, the density gradually decreases from 1.72 grams per cubic centimeter ($g/cm^3$) at the bottom of the crucible to below 1.68 $g/cm^3$ at the crucible mouth. Due to the low and uneven overall density of the crucible, and its strength and oxidation resistance are poor, resulting in a short service life of the crucible, and due to the low density of the crucible mouth, it is easy to crack from the crucible mouth and gradually extend to the bottom of the crucible during use, causing the crucible to be damaged. The service life of the current mainstream products of the crucible on the market is about 3 to 4 times. At the same time, in order to meet the demand for cost reduction, the loading capacity of graphitization is getting larger and larger, and an effective volume of the crucible needs to be increased as much as possible, resulting in the crucible diameter becoming larger and larger, the height becoming higher and higher, and the wall thickness becoming thinner and thinner, which will cause an upper part of the crucible to have a sharp decrease in quality. In order to ensure the yield and service life of the crucible, the process difficulty of the crucible is increasing, which hinders the improvement of the quality and life of the crucible.

The main forms of damage to the mainstream graphite crucibles in the market during use include the follows. (1) Cracks appear at an upper end of the crucible (i.e., the crucible mouth), and extend all the way to the bottom of the crucible. (2) Uneven oxidation is occurred on the crucible body. (3) The crucible mouth is preferentially corroded. Since the graphite crucible will be damaged in various ways during use, the service life of the graphite crucible in the related art is relatively short.

Therefore, there is an urgent need for a graphite crucible forming device to prepare the graphite crucible and thereby improve the service life of the graphite crucible.

SUMMARY

Accordingly, in order to overcome at least some of defects and disadvantages in the related art, embodiments of the disclosure provides a forming device and a preparation method of a graphite crucible to improve service life of the graphite crucible.

Specifically, on the one hand, the forming device of the graphite crucible provided by the embodiments of the disclosure includes a support frame, a male die, a crucible mouth pressing member and a female die. The support frame includes a base. The male die is disposed on the support frame and far away from the base, and the male die is movable reciprocally in a vertical direction relative to the support frame. The crucible mouth pressing member is disposed on the support frame and correspondingly disposed on a side of the male die close to the base. The crucible mouth pressing member is movable reciprocally in the vertical direction relative to the support frame. The crucible mouth pressing member defines an opening part allowing the male die to pass therethrough. The female die is disposed on the base and corresponding to the male die. The female die is configured to accommodate crucible paste, and the male die, the crucible mouth pressing member and the female die are configured to cooperatively form the crucible paste into the graphite crucible.

In an embodiment of the disclosure, the crucible mouth pressing member is an annular structure, an outer diameter of the crucible mouth pressing member is smaller than an inner diameter of the female die, and an inner diameter of the crucible mouth pressing member is greater than an outer diameter of the male die.

In an embodiment of the disclosure, the male die is a columnar structure, and the female die defines a paste accommodation groove. The paste accommodation groove is a columnar structure matched with the male die, and the outer diameter of the male die is smaller than an inner diameter of the paste accommodation groove. A ring width of the crucible mouth pressing member is W1=(D1-D2)÷2, where W1 represents the ring width of the crucible mouth pressing member, D1 represents the inner diameter of the paste accommodation groove, and D2 represents the outer diameter of the male die.

In embodiment of the disclosure, the crucible mouth pressing member includes a cylinder body and a limiting part connected to the cylinder body. The opening part is defined on the cylinder body, when the crucible mouth pressing member moves towards the female die to a preset height, the limiting part is abutted against the female die.

In an embodiment of the disclosure, the support frame further includes upright columns. The forming device of the graphite crucible further includes a first driving assembly and a second driving assembly. The first driving assembly includes a first hydraulic cylinder and a first sliding beam. The first hydraulic cylinder is disposed on the support frame and connected to the first sliding beam. The first sliding beam is slidably connected to the upright columns, the male die is fixedly connected to a side of the first sliding beam close to the base, and the first hydraulic cylinder is configured to drive the first sliding beam to move reciprocally in the vertical direction. The second driving assembly includes a second hydraulic cylinder and a second sliding beam. The second hydraulic cylinder is disposed on the support frame and connected to the second sliding beam. The second sliding beam is disposed on the side of the first sliding beam close to the base and slidably connected to the upright columns. The crucible mouth pressing member is fixedly connected to a side of the second sliding beam close to the base, and the second hydraulic cylinder is configured to drive the second sliding beam to move reciprocally in the vertical direction.

In an embodiment of the disclosure, the second sliding beam defines a male die avoidance hole, the male die avoidance hole is disposed corresponding to the male die, and the crucible mouth pressing member is disposed corresponding to the male die avoidance hole on the side of the second sliding beam close to the base.

In an embodiment of the disclosure, the second hydraulic cylinder is two in quantity, the two second hydraulic cylinders are symmetrically disposed on two sides of the first hydraulic cylinder and respectively connected to two ends of the second sliding beam through piston rods.

In an embodiment of the disclosure, the first sliding beam and the second sliding beam each define connecting through-holes, the connecting through-holes are sleeved on the upright columns, and the first sliding beam and the second sliding beam are slidably connected to the upright columns through the connecting through-holes.

In an embodiment of the disclosure, each of the connecting through-holes is provided with a guide sliding sleeve therein, the guide sliding sleeve is compatible with each of the upright columns, an inner sidewall of the guide sliding sleeve defines a lubrication groove, and a dust ring is disposed in the lubrication groove.

In an embodiment of the disclosure, the forming device of the graphite crucible further includes a first displacement controller and a second displacement controller. The first displacement controller is disposed on the first sliding beam and configured to control a displacement distance of the male die. The second displacement controller is disposed on the second sliding beam and configured to control a displacement distance of the crucible mouth pressing member.

In an embodiment of the disclosure, the second displacement controller is configured to further detect a displacement distance of the crucible mouth pressing member being squeezed by the crucible paste to move along a direction away from the base, to thereby detect performance of the crucible paste.

In an embodiment of the disclosure, the male die is at least one in quantity. The forming device of the graphite crucible further includes a moving platform, and the moving platform is slidably connected to the base. The at least one male die is disposed on the moving platform, and the moving platform is configured to drive the at least one male die to move reciprocally relative to the base.

On the other hand, the embodiment of the disclosure further provides a preparation method of the graphite crucible, including:

adding crucible paste with a setting weight into a female die;

moving a male die and a crucible mouth pressing member to approach the female die in a vertical direction to squeeze the crucible paste to thereby form the graphite crucible; and moving the male die and the crucible mouth pressing member along a direction away from the female die in the vertical direction to perform demolding.

In an embodiment of the disclosure, the moving a male die and a crucible mouth pressing member to approach the female die in a vertical direction to squeeze the crucible paste to thereby form the graphite crucible specifically includes:

moving the male die and the crucible mouth pressing member towards the female die synchronously to thereby squeeze the crucible paste, so that the crucible paste is subjected to constant pressure for a preset duration; and continuing to move the male die in a direction towards the base, and synchronously moving the crucible mouth pressing member in a direction away from the base, to thereby form the graphite crucible.

In an embodiment of the disclosure, the moving the male die and the crucible mouth pressing member towards the female die synchronously to thereby squeeze the crucible paste, so that the crucible paste is subjected to constant pressure for a preset duration specifically includes:

moving the male die and the crucible mouth pressing member towards the female die synchronously to thereby contact the crucible paste;

continuing to move the male die and the crucible mouth pressing member in the direction towards the base synchronously, and gradually increasing pressure on the male die and the crucible mouth pressing member to setting pressure;

keeping the pressure of the male die and the crucible mouth pressing member applied on the crucible paste at the setting pressure for the preset duration, so that the crucible paste is subjected to constant pressure.

In an embodiment of the disclosure, the continuing to move the male die in a direction towards the base, and synchronously moving the crucible mouth pressing member in a direction away from the base, to thereby form the graphite crucible specifically includes:

gradually increasing pressure of the male die, and moving the male die in the direction towards the base to a first limiting position; wherein the first limiting position is configured to limit a thickness of a bottom of the graphite crucible; and gradually reducing pressure of the crucible mouth pressing member, and synchronously moving the crucible mouth pressing member in the direction away from the base to a second limiting position; wherein the second limiting position is higher than a reference height of the graphite crucible.

In an embodiment of the disclosure, after the continuing to move the male die in a direction towards the base, and synchronously moving the crucible mouth pressing member in a direction away from the base, to thereby form the graphite crucible, the preparation method further includes:

keeping a position of the male die unchanged, increasing the pressure of the crucible mouth pressing member, and slowly moving the crucible mouth pressing member down to a third limiting position; wherein the third limiting position is configured to limit the reference height of the graphite crucible; and keeping the pressure of the male die and the crucible mouth pressing member applied on the crucible paste unchanged for the preset duration to thereby form a crucible mouth.

In an embodiment of the disclosure, the moving the male die and the crucible mouth pressing member along a direction away from the female die in the vertical direction to perform demolding specifically includes:

releasing the pressure of the male die and the crucible mouth pressing member applied on the crucible paste synchronously;

keeping a position of the crucible mouth pressing member unchanged, and moving the male die along a direction away from the female die to an initial position of the male die; and moving the crucible mouth pressing member along a direction away from the female die to an initial position of the crucible mouth pressing member.

In an embodiment of the disclosure, after the moving the male die and the crucible mouth pressing member along a direction away from the female die in the vertical direction to perform demolding, the preparation method further includes:

injecting 50% to 90% of a crucible volume of a cooling liquid into the graphite crucible.

Still on the other hand, the embodiment of the disclosure further provides a forming device of a graphite crucible, including: a support frame, a female die, a male die and a crucible mouth pressing member. The female die is connected to the support frame, and the female die defines a paste accommodation groove configured to accommodate crucible paste. The male die is connected to the support frame and disposed corresponding to the paste accommodation groove. The crucible mouth pressing member is connected to the support frame, the crucible mouth pressing member defines an opening part, and the opening part corresponds to the male die and the paste accommodation groove. The male die and the crucible mouth pressing member are configured to cooperatively squeeze the crucible paste in the paste accommodation groove to thereby form the graphite crucible. During forming the graphite crucible, the crucible mouth pressing member is movable reciprocally in a vertical direction relative to the support frame, and is configured to enter and exit the paste accommodation groove. The male die is movable reciprocally in the vertical direction relative to the support frame, and is configured to enter and exit the paste accommodation groove through the opening part.

It can be seen from the above that the embodiment of the disclosure sets the forming device of the graphite crucible to include the support frame, the male die, the crucible mouth pressing member and the female die, the female die is disposed on the base, the male die is disposed on a side of the support frame facing away from the base, the crucible mouth pressing member is disposed between the male die and the female die, the male die can pass through the crucible mouth pressing member through the opening part on the crucible mouth pressing member, and the female die is configured to accommodate the crucible paste, and the male die, the crucible mouth pressing member and the female die cooperate to each other, so that the crucible paste forms the graphite crucible. Through the settings of the crucible mouth pressing member, the crucible mouth pressing member and the male die synchronously perform constant pressure forward extrusion on the crucible paste, which may effectively improve a density of the graphite crucible, and ensure uniformity of the density, so as to improve overall intensity and oxidation resistance of the graphite crucible. In addition, after the graphite crucible is formed, the pressure of the male die is reduced, a position of the male die remains unchanged, the pressure of the crucible mouth pressing member is increased, the crucible mouth pressing member is slowly moved down to the standard height of the graphite crucible, and the pressure of the crucible mouth pressing member remains unchanged, so that precise control of the height of the graphite crucible and improvement of the density of the crucible mouth are achieved, thereby precisely controlling a size of the graphite crucible, and further greatly improving the service life of the graphite crucible.

BRIEF DESCRIPTION OF DRAWINGS

In order to describe technical solutions of embodiments of the disclosure clearer, drawings required in the descriptions of the embodiments will be simply introduced below. Apparently, the drawings in the following descriptions are merely some of the embodiments, for those skilled in the art, other drawings can be obtained according to these drawings without creative work.

FIG. 9 illustrates a flowchart of a step S20 in FIG. 8.

FIG. 10 illustrates a flowchart of a step S21 in FIG. 9.

FIG. 11 illustrates a flowchart of a step S22 in FIG. 9.

FIG. 12 illustrates another flowchart of the step 20 in FIG. 8.

FIG. 13 illustrates a flowchart of a step S30 in FIG. 8

DESCRIPTION OF REFERENCE SIGNS

100—forming device of graphite crucible; 10—first driving assembly; 11—first hydraulic cylinder; 12—first sliding beam; 121—connecting through-hole; 1211—guide sliding sleeve; 1212—lubrication groove; 1213—dust ring; 122—first displacement controller; 13—piston rod; 20—second driving assembly; 21—second hydraulic cylinder; 22—second sliding beam; 221—male die avoidance hole; 222—second displacement controller; 23—piston rod; 31—male die; 32—crucible mouth pressing member; 321—cylinder body; 322—limiting part; 323—opening part; 33—female die; 331—paste accommodation groove; 332—sidewall top; 40—support frame; 41—base; 42—upright column; 50—moving platform; 60—crucible paste.

DETAILED DESCRIPTION OF EMBODIMENTS

In order to make purposes, technical solutions and advantages of embodiments of the disclosure clearer, the technical solutions in the embodiments of the disclosure will be clearly and completely described below in conjunction with accompanying drawings. Apparently, the described embodiments are merely some of the embodiments of the disclosure, not all of them. Based on the embodiments described in the disclosure, all other embodiments obtained by those skilled in the art without creative work belong to a protection scope of the disclosure.

It should be noted that all directional indications (such as up, down, left, right, front, back, top, and bottom) in the embodiments of the disclosure are only used to explain relative position relationships and movements in components under a certain specific posture (as shown in the accompanying drawings). If the specific posture changes, the directional indications will also change accordingly. In addition, a term "vertical" involved in the embodiments of the disclosure and the claims means that an angle between two elements is 90° or there is a deviation of −5° to +5°, and a term "parallel" involved means that the angle between the two elements is 0° or there is a deviation of −5° to +5°.

In the embodiments of the disclosure, descriptions of "first" and "second" are only for descriptive purposes and cannot be understood as indicating or implying their relative importance or implicitly indicating the number of the indicated technical features. Therefore, the features defined as "first" or "second" may explicitly or implicitly include at least one of the features.

Figure 1:
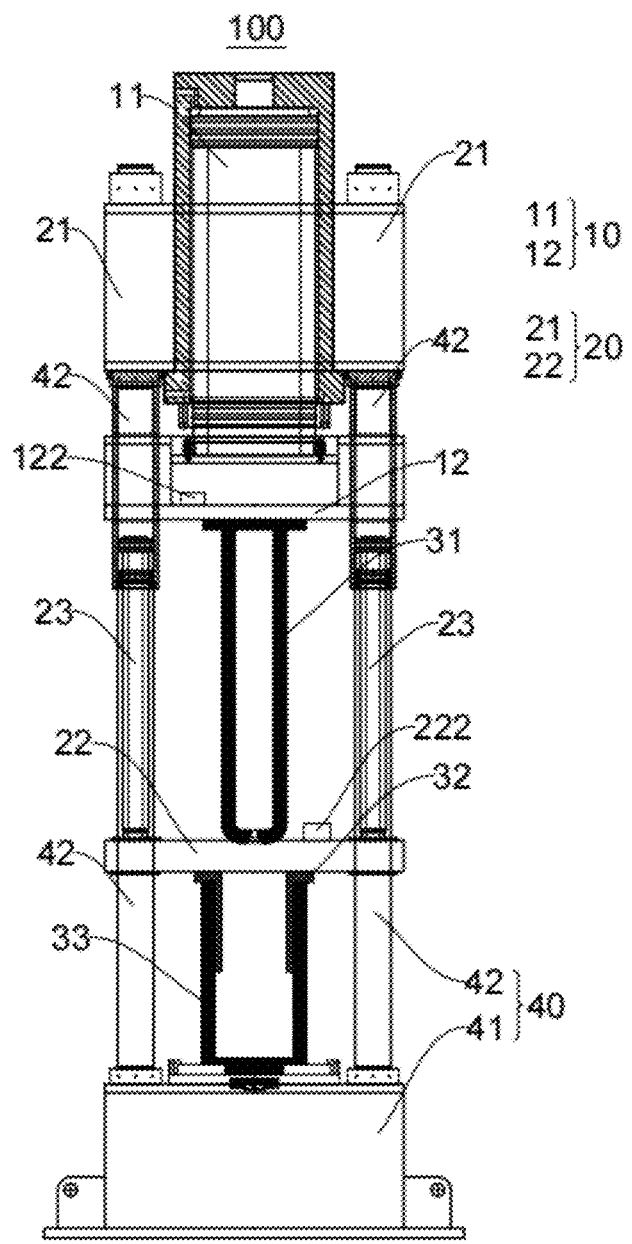
FIG. 1 illustrates a schematic structural diagram of a forming device of a graphite crucible according to an embodiment of the disclosure.
Figure 2:
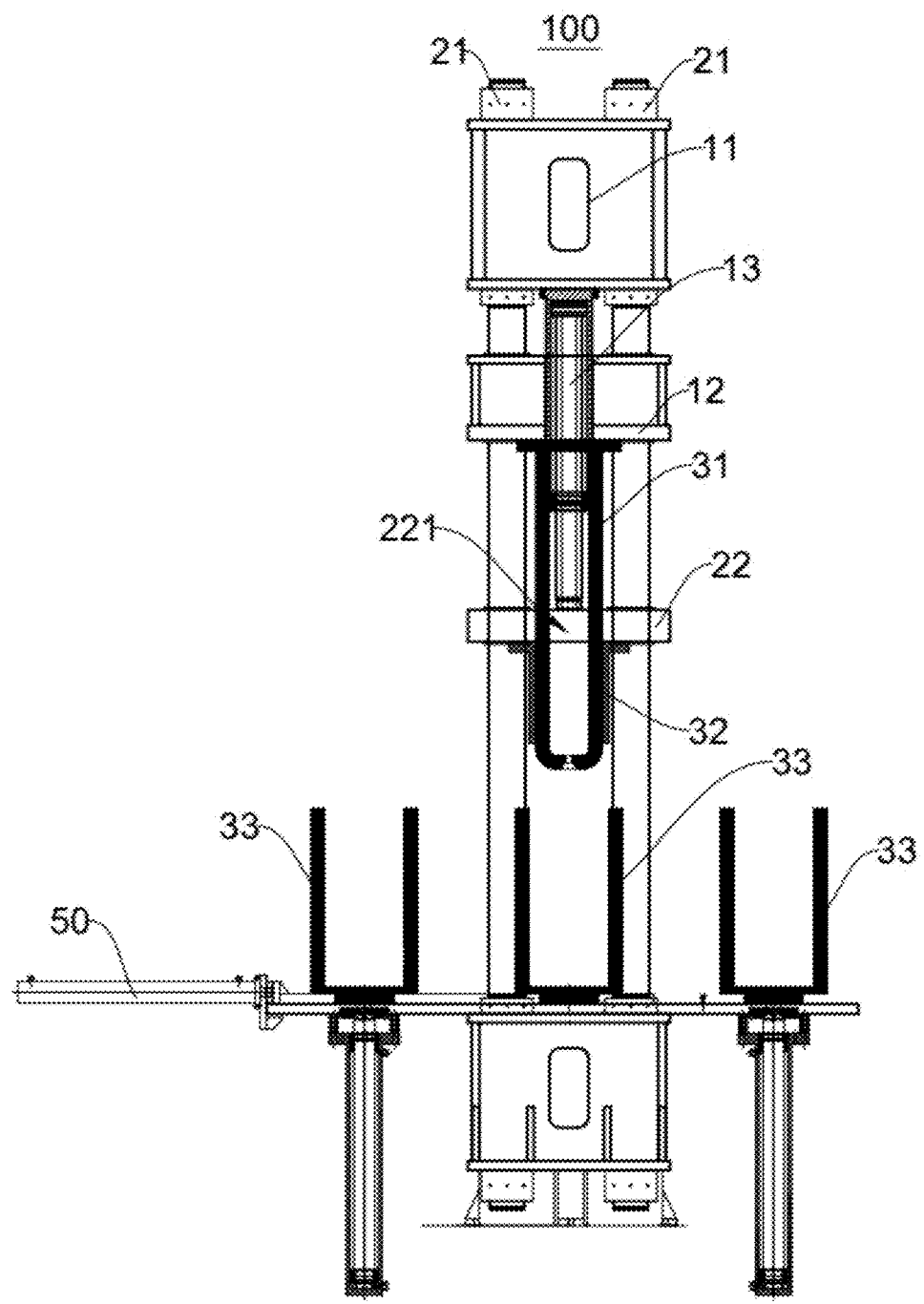
FIG. 2 illustrates another schematic structural diagram of the forming device of the graphite crucible according to an embodiment of the disclosure.

Referring to FIG. 1 and FIG. 2, an embodiment of the disclosure provides a forming device of a graphite crucible 100, including a support frame 40, a male die 31, a crucible mouth pressing member 32 and a female die 33.

Figure 3:
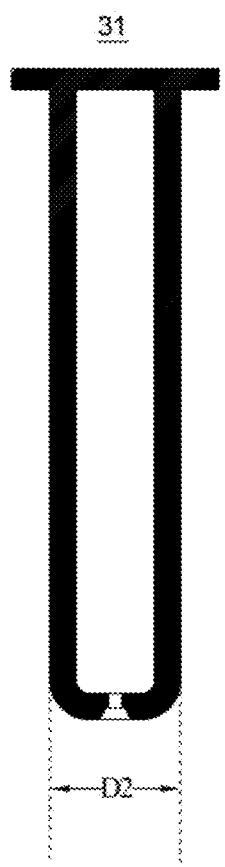
FIG. 3 illustrates a schematic sectional structural diagram of a male die of the forming device of the graphite crucible according to an embodiment of the disclosure.
Figure 4:
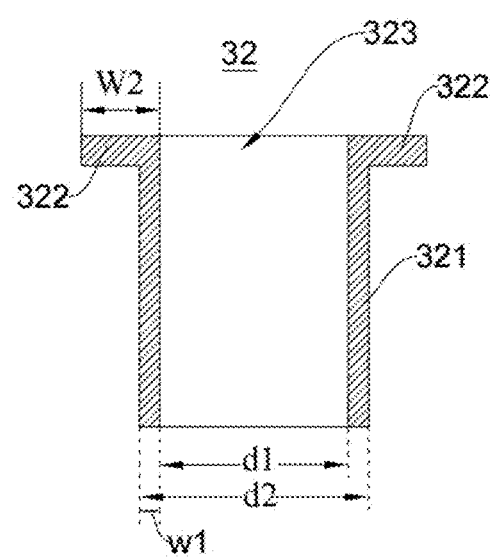
FIG. 4 illustrates a schematic sectional structural diagram of a crucible mouth pressing member of the forming device of the graphite crucible according to an embodiment of the disclosure.
Figure 5:
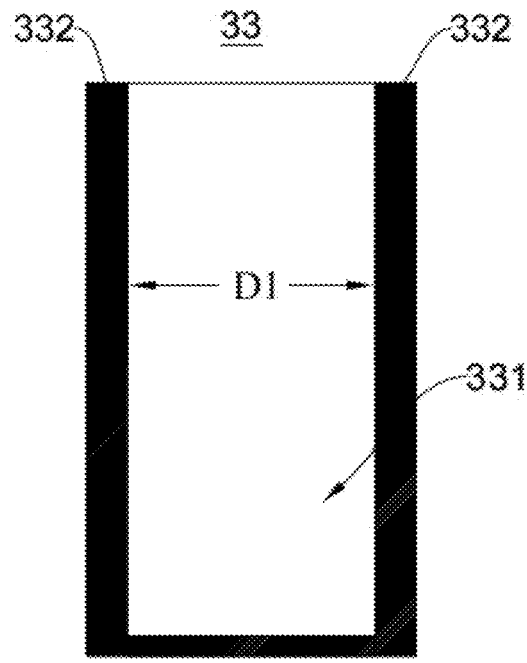
FIG. 5 illustrates a schematic sectional structural diagram of a female die of the forming device of the graphite crucible according to an embodiment of the disclosure.

Specifically, the support frame 40 may be, for example, a metal support frame, and the support frame 40 has good intensity to provide stable support. The support frame 40 may include, for example, a base 41, and the base 41 may be, for example, disposed on a bottom of the support frame 40. Referring to FIG. 3, the male die 31 may be, for example, a columnar structure, and a shape of the male die 31 may be, for example, matched with an inner wall of a graphite crucible. The male die 31 is disposed on the support frame 40, and may be disposed on a side of the support frame 40 facing away from the base 41, that is, the male die 31 is disposed on an upper part of the support frame 40. The male die 41 is movable reciprocally in a vertical direction relative to the support frame 40. The male die 31 may be, for example, a hollow structure or a solid structure, and the embodiment is not limited to this. Referring to FIG. 4, the crucible mouth pressing member 32 is disposed on the support frame 40, and the crucible mouth pressing member 32 is correspondingly disposed on a side of the male die 31 close to the base 41, that is, the crucible mouth pressing member 32 may be, for example, disposed between the male die 31 and the base 41. The crucible mouth pressing member 32 is movable reciprocally in the vertical direction relative to the support frame 40. The crucible mouth pressing member 32 may be, for example, a cylindrical structure. The crucible mouth pressing member 32 defines an opening part 323, and the opening part 323 is used for the male die 31 to pass through. The opening part 323 may be, for example, defined on a vertical direction of the crucible mouth pressing member 32, to make the crucible mouth pressing member 32 to form the cylindrical structure. The female die 33 is disposed on the base 41 and corresponding to the male die 31. The male die 31, the crucible mouth pressing member 32 and the female die 33 may be, for example, disposed on a same perpendicular line, that is, when the male die 31 and the crucible mouth pressing member 32 move down, the male die 31 can enter the female die, and the crucible mouth pressing member 32 can be moved between the male die 31 and the female die 33. Referring to FIG. 5, an inner wall of the female die 33 may be matched with an outer wall of the graphite crucible. The female die 33 may define a paste accommodation groove 331, and the paste accommodation groove 331 is used to accommodate crucible paste 60. The male die 31, the crucible mouth pressing member 32 and the female die 33 are configured to cooperatively form the crucible paste into the graphite crucible. During forming the graphite crucible, the crucible mouth pressing member 32 is movable reciprocally in the vertical direction relative to the support frame 40, and is configured to enter and exit the paste accommodation groove 331. The male die 31 is movable reciprocally in the vertical direction relative to the support frame 40, and is configured to enter and exit the paste accommodation groove 331 through the opening part 323.

The forming device of the graphite crucible 100 of the embodiment makes the crucible paste 60 to form the graphite crucible through the cooperation of the male die 31, the crucible mouth pressing member 32 and the female die 33. Through the settings of the crucible mouth pressing member 32, the crucible mouth pressing member 32 and the male die 31 synchronously perform constant pressure forward extrusion (a direction from top to bottom) on the crucible paste 60, which can effectively improve a density of the graphite crucible, and ensure uniformity of the density, so as to improve overall intensity and oxidation resistance of the graphite crucible, to further improve service life of the graphite crucible. Moreover, during using the forming device of the graphite crucible 100 to prepare the graphite crucible, after the graphite crucible is formed, pressure of the male die 31 is reduced, a position of the male die 31 remains unchanged, pressure of the crucible mouth pressing member 32 is increased, the crucible mouth pressing member 32 is slowly moved down to a standard height (i.e., the reference height) of the graphite crucible, and the pressure of the crucible mouth pressing member 32 remains unchanged, so that precise control of the height of the graphite crucible and improvement of the density of the crucible mouth are achieved, thereby precisely controlling a size of the graphite crucible, and further improving the service life of the graphite crucible.

In an embodiment, the crucible mouth pressing member 32 may be, for example, an annular structure, an outer diameter d2 of the crucible mouth pressing member 32 is smaller than an inner diameter of the female die 33, and an inner diameter d1 of the crucible mouth pressing member 32 is greater than an outer diameter D2 of the male die 31. Specifically, the male die 31 may be, for example, a columnar structure, and the paste accommodation groove 331 may be also a columnar structure matched with the male die 31. The outer diameter of the male die 31 is smaller than an inner diameter of the paste accommodation groove 331. A ring width (also referred to as a wall thickness) of the crucible mouth pressing member 32 is $W1=(D1-D2)\div2$, where W1 represents the ring width of the crucible mouth pressing member 32, D1 represents the inner diameter of the paste accommodation groove 331, and D2 represents the outer diameter of the male die 31. A size of the ring width of the crucible mouth pressing member 32 may be, for example, the same as the wall thickness of the graphite crucible, or the size of the ring width of the crucible mouth pressing member 32 may be, for example, the same as a wall thickness of the crucible mouth.

Referring to FIG. 4 again, the crucible mouth pressing member 32 may include, for example, a cylinder body 321 and a limiting part 322, and the limiting part 322 is connected to the cylinder body 321. Specifically, the limiting part 322 is connected to an end of the cylinder body 321. The opening part 323 is defined on the cylinder body 321, and the limiting part 322 may be, for example, disposed around an outside of the opening part 323 of the cylinder body 321. The female die 33 may have a sidewall, and a side of the sidewall close to the male die 32 is a sidewall top 332. When the crucible mouth pressing member 32 moves towards the female die 33 to a preset height, the limiting part 322 is abutted against the female die 33. Specifically, the limiting part 322 us abutted against the sidewall top 332 to limit a height of the cylinder body 321 entering the female die 33. In an embodiment, a width W2 of the limiting part 322 may be, for example, greater than or equal to a thickness of a sidewall of the female die 33, so that it can better limit and improve the stability of limit.

The support frame 40 may include, for example, upright columns 42. The upright columns 42 may be, for example, slender rod-shaped components, and an end of each upright column 42 is connected to the base 41. The support frame 40 may include, for example, four columns 42, and the four columns 42 may be assembled into the support frame 40 through crossbeams and locking nuts. The forming device of the graphite crucible 100 provided by the embodiment further includes a first driving assembly 10 and a second driving assembly 20. The first driving assembly 10 is connected to the male die 31, and the first driving assembly 10 may be, for example, disposed on the support frame 40, and configured to drive the male die 31 to slide up and down relative to the support frame 40. The second driving assembly 20 is connected to the crucible mouth pressing member 32, and the second driving assembly 20 may be, for example, disposed on the support frame 40, and configured to drive the crucible mouth pressing member 32 to slide up and down relative to the support frame 40.

Figure 6:
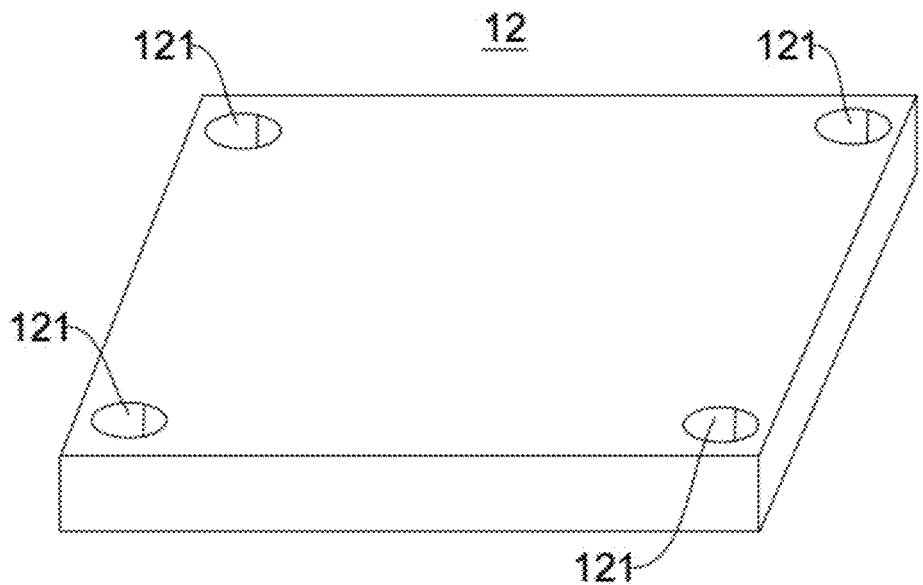
FIG. 6 illustrates a schematic structural diagram of a first sliding beam of the forming device of the graphite crucible according to an embodiment of the disclosure.
Figure 7:
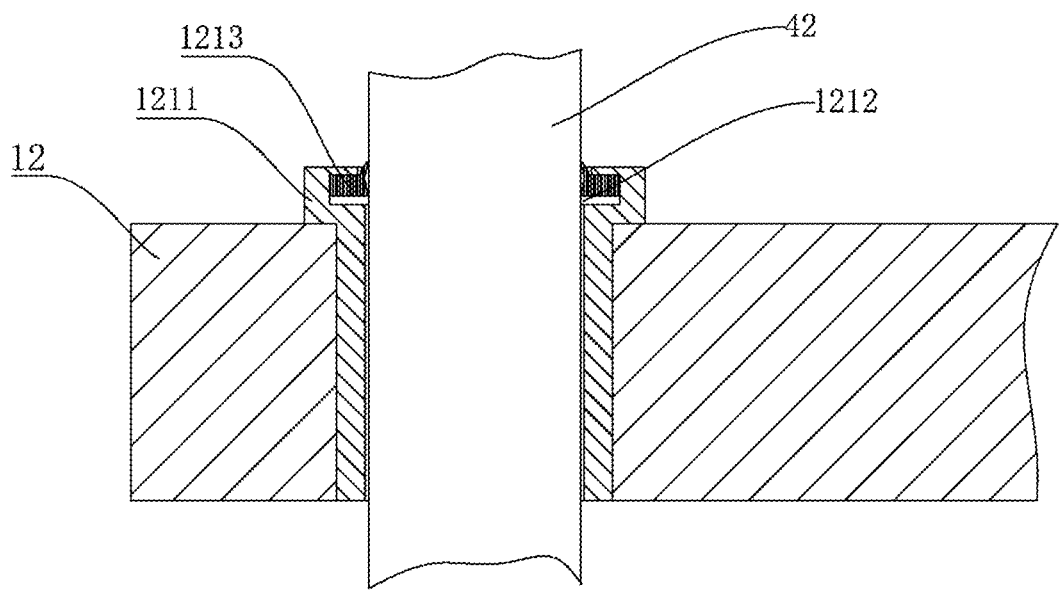
FIG. 7 illustrates a schematic sectional structural diagram of the first sliding beam of the forming device of the graphite crucible according to an embodiment of the disclosure.

Specifically, the first driving assembly 10 may include, for example, a first hydraulic cylinder 11 and a first sliding beam 12. The first hydraulic cylinder 11 may be, for example, a hydro-cylinder, or other hydraulic cylinders, and the embodiment is not limited to this. The support frame 40 may be further provided with an upper crossbeam thereon, the upper crossbeam may be, for example, fixedly connected to the upright columns 42. Specifically, the upper crossbeam is connected to an end of each upright column 42 facing away from the base 41. The first hydraulic cylinder 11 may be, for example, disposed in the upper crossbeam and fixed with the upper crossbeam through a flange. The first sliding beam 12 may be, for example, connected to the first hydraulic cylinder 11 through a piston rod 13 on the first hydraulic cylinder 11, and the piston rod 13 may be, for example, connected to the first sliding beam 12 through a connecting flange. The first sliding beam 12 may be, for example, slidably connected to the upright columns 42, and the male die 31 may be, for example, fixedly connected to a side of the first sliding beam 12 close to the base 41. The first sliding beam 12 is movable reciprocally along the upright column 42 with the guidance of the upright columns 42. Referring to FIG. 6, the first sliding beam 12 may define connecting through-holes 121, and the connecting through-holes 121 are sleeved on the upright columns 42. The first sliding beam 12 is slidably connected to the upright columns 42 through the connecting through-holes 121. Referring to FIG. 7, each of the connecting through-holes 121 may be, for example, installed with a guide sliding sleeve 1211 therein for guidance, and the guide sliding sleeve 1211 is compatible with each upright column 42. The guide sliding sleeve 1211 may define a lubrication groove 1212 therein, and lubricant such as grease may be disposed in the lubrication groove 1212, which can make the first sliding beam 12 move back and forth more smoothly in the vertical direction, that is, sliding up and down. A dust ring 1213 may be disposed in the lubrication groove 1212, which can prevent dust from entering, thereby avoiding affecting the sliding effect due to excessive dust. The first hydraulic cylinder 11 can drive the first sliding beam 12 to move reciprocally in the vertical direction through the piston rod 13, thereby driving the male die 31 to move reciprocally in the vertical direction through the movement of the first sliding beam 12.

The second driving assembly may include, for example, a second hydraulic cylinder 21 and a second sliding beam 22. The second hydraulic cylinder 21 may be, for example, a hydro-cylinder, or other hydraulic cylinders, and the embodiment is not limited to this. The second hydraulic cylinder 21 may be, for example, disposed in the upper crossbeam, and fixed with the upper crossbeam through the flange. The second sliding beam 22 may be, for example, connected to the second hydraulic cylinder 21 through a piston rod 23 on the second hydraulic cylinder 21, and the piston rod 23 may be, for example, connected to the second sliding beam 22 through the connecting flange. The second sliding beam 22 may be, for example, slidably connected to the upright columns 42, and the crucible mouth pressing member 32 may be, for example, fixedly connected to a side of the second sliding beam 22 close to the base 41. The second sliding beam 22 can move reciprocally along the upright columns 42 with the guidance of the upright columns 42. The second sliding beam 22 may define connecting through-holes (not shown in drawings), and the connecting through-holes are sleeved on the upright columns 42. The second sliding beam 22 is slidably connected to the upright columns 42 through the connecting through-holes. Each of the connecting through-holes may be, for example, installed with a guide sliding sleeve therein for guidance, and the guide sliding sleeve is compatible with each upright column 42. The guide sliding sleeve may define a lubrication groove therein, and lubricant such as grease may be disposed in the lubrication groove, which can make the second sliding beam 22 move back and forth more smoothly in the vertical direction, that is, sliding up and down. A dust ring may be disposed in the lubrication groove, which can prevent dust from entering, thereby avoiding affecting the sliding effect due to excessive dust. The second hydraulic cylinder 21 can drive the second sliding beam 12 to move reciprocally in the vertical direction through the piston rod 23, thereby driving the crucible mouth pressing member 32 to move reciprocally in the vertical direction through the movement of the second sliding beam 22.

In an embodiment, the second hydraulic cylinder 22 may be two in quantity, and the two second hydraulic cylinders 22 may be, for example, symmetrically disposed on two sides of the first hydraulic cylinder 11, and connected to two ends of the second sliding beam 22 respectively through the piston rods 23. Through the settings of the two second hydraulic cylinders 22, movement of the second sliding beam 22 can remain balanced, making the motion more stable. The two second hydraulic cylinders 22 are disposed on the two sides of the first hydraulic cylinder 11, that is, the first hydraulic cylinder 11 and the second hydraulic cylinders 22 are staggered, so that the structure layout is more compact, thereby improving driving efficiency while saving installation space.

Referring to FIG. 2 again, the second sliding beam 22 may further define a male die avoidance hole 221. The male die avoidance hole 221 is disposed corresponding to the male die 31, and the crucible mouth pressing member 32 is disposed corresponding to the male die avoidance hole 221 on the side of the second sliding beam 22 close to the base 41. The male die avoidance hole 221 may be, for example, defined on the second sliding beam 22, and a size of the male die avoidance hole 221 is matched with a size of the male die 31, that is, an inner diameter of the male die avoidance hole 221 is greater than or equal to the outer diameter of the male die 31. The male die avoidance hole 221 is matched with the opening part 323 on the crucible mouth pressing member 32, so that the male die avoidance hole 221 can make the male die 31 to pass through. During preparing the graphite crucible, the male die 31 can pass through the male die avoidance hole 221 and the opening part 323 sequentially to enter the female die 33, thereby preparing the graphite crucible.

In an implementation method of the embodiment, the forming device of the graphite crucible 100 may further include a first displacement controller 122 and a second displacement controller 222. The first displacement controller 122 and the second displacement controller 222 may adopt linear displacement sensors, and may be provided with up and down limit forming switches. The first displacement controller 122 may be, for example, disposed on the first sliding beam 12, and the first displacement controller 122 is configured to control a displacement distance of the male die 31. By setting the first displacement controller 122, the displacement distance of the male die 31 can be precisely controlled, thereby precisely controlling a thickness of a bottom of the graphite crucible. The second displacement controller 222 is disposed on the second sliding beam 22, and the second displacement controller 222 is configured to control a displacement distance of the crucible mouth pressing member 32. By setting the second displacement controller 222, the displacement distance of the crucible mouth pressing member 32 can be precisely controlled, thereby precisely controlling a height of the graphite crucible.

In an embodiment, the second displacement controller 222 can be configured to detect a displacement distance of the crucible mouth pressing member 32 being squeezed by the crucible paste 60 to move along a direction away from the base 41. During using the forming device of the graphite crucible 100 to prepare the graphite crucible, the crucible paste 60 will squeeze the crucible mouth pressing member 32 upward under the pressure of the male die 31, the crucible mouth pressing member 32 is squeezed to move in a direction away from the base 41, and the second displacement controller 222 can detect the displacement distance of the crucible mouth pressing member 32. The characterization of performance of the crucible paste has always been a difficult problem for the carbon industry, and it plays a crucial role in the performance and stability of carbon products. The performance of paste is closely related to its formula, particle size distribution, and temperature, and is usually judged by technical personnel's experience, which cannot be quantitatively characterized. Through the displacement distance of the crucible mouth pressing member 32, the performance of the crucible paste can be reflected, the greater the displacement distance, the better the plasticity of the crucible paste.

In an implementation method of the embodiment, the forming device of the graphite crucible 100 may further include a moving platform 50, the female die 33 may be, for example, disposed on the moving platform 50, and a number of the female dies 33 may be two or more. The moving platform 50 may be, for example, a bidirectional moving table. The moving platform 50 may be, for example, fixed on the base 41, and may be provided with two or more stations thereon. The female dies 33 may have a same number of the stations, and the female dies 33 are disposed on the stations. The moving platform 50 can move the female die 33 to a position corresponding to the male die 31, or move to other positions. Through the settings of the moving platform 50, it is convenient to move and eject the formed graphite crucible.

Figure 8:
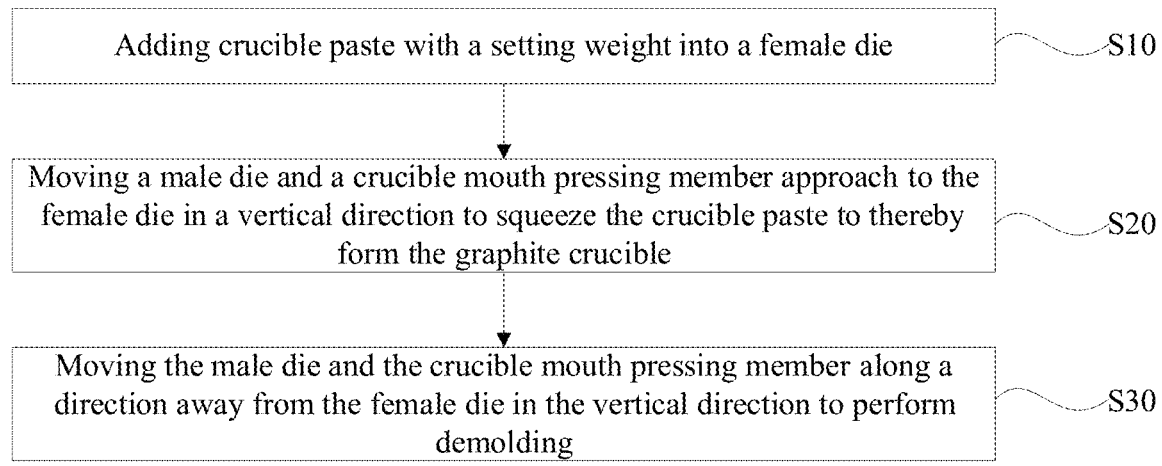
FIG. 8 illustrates a flowchart of a preparation method of a graphite crucible according to an embodiment of the disclosure.

Referring to FIG. 8, an embodiment of the disclosure further provides a preparation method of a graphite crucible, including the following steps S10-S30.

In step S10, crucible paste with a setting weight is added into a female die.

In step S20, a male die and a crucible mouth pressing member are moved to approach the female die in a vertical direction to squeeze the crucible paste to thereby form the graphite crucible.

In step S30, the male die and the crucible mouth pressing member are moved along a direction away from the female die in the vertical direction to preform demolding.

In an embodiment, referring to FIG. 9, in step S20, the male die and the crucible mouth pressing member are moved to approach the female die in the vertical direction to squeeze the crucible paste to thereby form the graphite crucible, and the step S20 may specifically include the following steps S21-S22.

In step S21, the male die and the crucible mouth pressing member are synchronously moved towards the female die to thereby squeeze the crucible paste, so that the crucible paste is subjected to constant pressure for a preset duration.

In step S22, the male die is continuously moved in a direction towards the base, and the crucible mouth pressing member is synchronously moved in a direction away from the base, to thereby form the graphite crucible.

Referring to FIG. 10, the step S21 specifically includes the following steps S211-S213.

In step S211, the male die and the crucible mouth pressing member are moved towards the female die synchronously to thereby contact the crucible paste.

In step S212, the male die and the crucible mouth pressing member are synchronously moved in the direction towards the base, and pressure on the male die and the crucible mouth pressing member on the crucible each are gradually increased to setting pressure.

In step S213, the pressure of the male die and the crucible mouth pressing member applied on the crucible paste is kept at the setting pressure for the preset duration, so that the crucible paste is subjected to constant pressure.

Referring to FIG. 11 the step S22 specifically includes the following steps S221-S222.

In step S221, pressure of the male die is gradually increased, and the male die is moved in the direction towards the base to a first limiting position, and the first limiting position is configured to limit a thickness of a bottom of the graphite crucible.

In step S222, pressure of the crucible mouth pressing member is gradually reduced, and the crucible mouth pressing member is synchronously moved in the direction away from the base to a second limiting position, and the second limiting position is higher than a reference height (i.e., the standard height) of the graphite crucible.

Referring to FIG. 12, after the step S22, the preparation method further includes the following steps S23-S24.

In step S23, a position of the male die is kept unchanged, the pressure of the crucible mouth pressing member is increased, and the crucible mouth pressing member is slowly moved down to a third limiting position. The third limiting position is configured to limit the reference height of the graphite crucible.

In step S24, the pressure of the male die and the crucible mouth pressing member applied on the crucible paste is kept unchanged for the preset duration to thereby form a crucible mouth.

Referring to FIG. 13, in the step S30, the male die and the crucible mouth pressing member are moved along a direction away from the female die in the vertical direction to preform demolding, and the step S30 specifically includes the following steps S31-S33.

In step S31, the pressure of the male die and the crucible mouth pressing member applied on the crucible paste is synchronously released.

In step S32, a position of the crucible mouth pressing member remains unchanged, and the male die is moved along the direction away from the female die to an initial position of the male die.

In step S33, the crucible mouth pressing member is moved along the direction away from the female die to an initial position of the crucible mouth pressing member.

In an implementation method of the embodiment, the preparation method of the graphite crucible further includes the following steps. The displacement distance of the male die is controlled by the first displacement controller, and the displacement distance of the crucible mouth pressing member is controlled by the second displacement controller. In the step S22, the pressure of the crucible mouth pressing member is gradually reduced, and the crucible mouth pressing member is synchronously moved in the direction away from the base to the second limiting position, and the second limiting position is higher than the reference height of the graphite crucible, and the step S222 further includes that the second displacement controller detects the displacement distance of the crucible mouth pressing member to reflect performance of the crucible paste. Under the conditions of the setting pressure of the male die and the crucible mouth pressing member, the displacement distance of the crucible mouth pressing member can be detected by the second displacement controller, which can reflect the performance of the crucible paste.

In an implementation method of the embodiment, after the moving the male die and the crucible mouth pressing member along a direction away from the female die in the vertical direction to perform demolding, the preparation method further includes that 50% to 90% of a crucible volume of a cooling liquid is injected into the graphite crucible. By injecting 50% to 90% of the crucible volume of the cooling liquid into the graphite crucible, the graphite crucible is caused to cool and shrink, facilitating the demolding of the graphite crucible and improving demolding efficiency. The cooling liquid may be, for example, cooling water or other cooling liquid, which can be selected according to actual needs.

Referring to FIGS. 13A to 13F, the preparation method of the graphite crucible provided by the embodiment can be applied in the forming device of the graphite crucible 100 provided by the above embodiment, and the using method of the forming device of the graphite crucible 100 is described in detail below.

Figure 14A:
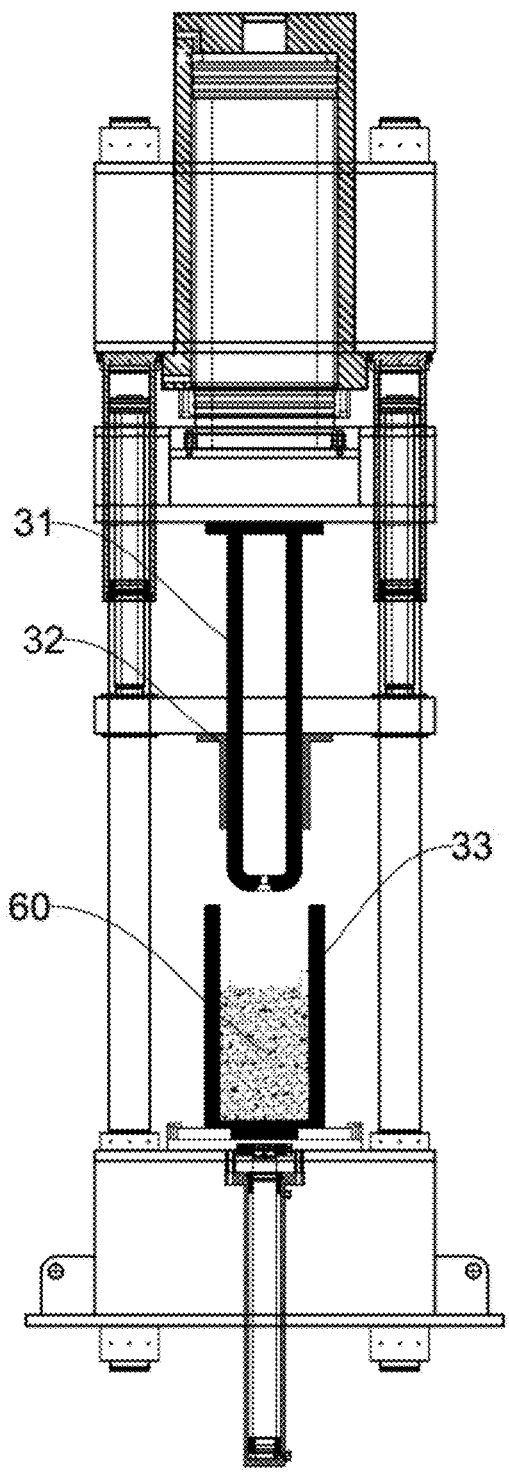
FIG. 14A-14F illustrates schematic diagrams of a preparation process of the graphite crucible according to an embodiment of the disclosure.

Referring to FIG. 14A, when the first hydraulic cylinder 11 and the second hydraulic cylinders 21 are in their initial positions, the male die 31 and the crucible mouth pressing member 32 are in their initial positions. The crucible paste 60 with the setting weight is added into the female die 33, and the setting weight may be a weight of the crucible paste 60 required to prepare a graphite crucible, which can be specifically set according to actual needs. The female die 33 added with the crucible paste 60 can be moved to a position of the base 41 corresponding to the male die 31 through the moving platform 50.

Figure 14B:
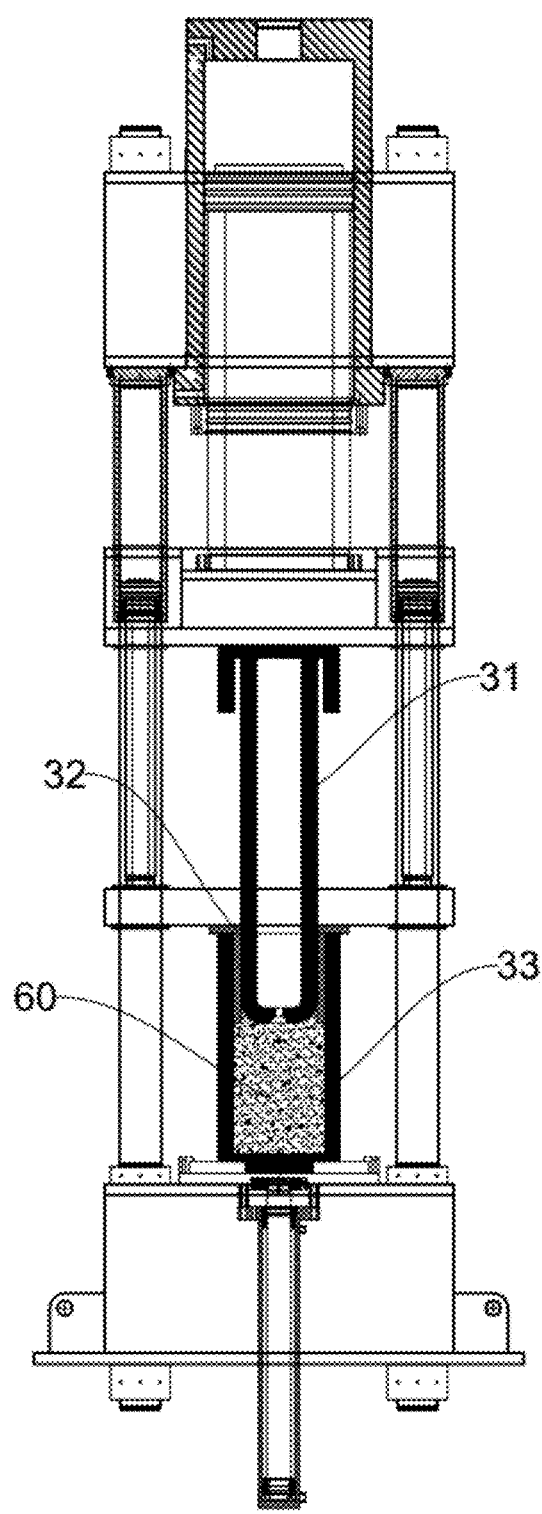

Referring to FIG. 14B, the first hydraulic cylinder 11 and the second hydraulic cylinders 21 respectively drive the first sliding beam 12 and the second sliding beam 22 to synchronously move in a direction towards the base 41 in the vertical direction, that is, move downward, so that the male die 31 passes through the opening part 323 of the crucible mouth pressing member 32 and moves downward together with the crucible mouth pressing member 32 to contact the crucible paste 60 in the female die 33. The first hydraulic cylinder 11 and the second hydraulic cylinders 21 continue to move downward synchronously, the pressure of the male die 31 and the crucible mouth pressing member 32 is gradually increased to the setting pressure, and the pressure of the male die 31 and the crucible mouth pressing member 32 is kept at the setting pressure for the preset duration, so that the crucible paste is subjected to constant pressure. The setting pressure and the preset duration here can be set according to actual needs. The pressure of the male die 31 and the crucible mouth pressing member 32 is synchronized to the setting pressure, then remain unchanged for the preset duration, that is, maintain constant pressure for the preset duration, so that each region of the crucible paste 60 in the female die 33 has equal pressure, and the internal pressure of the crucible paste 60 in each region is uniform.

Figure 14C:
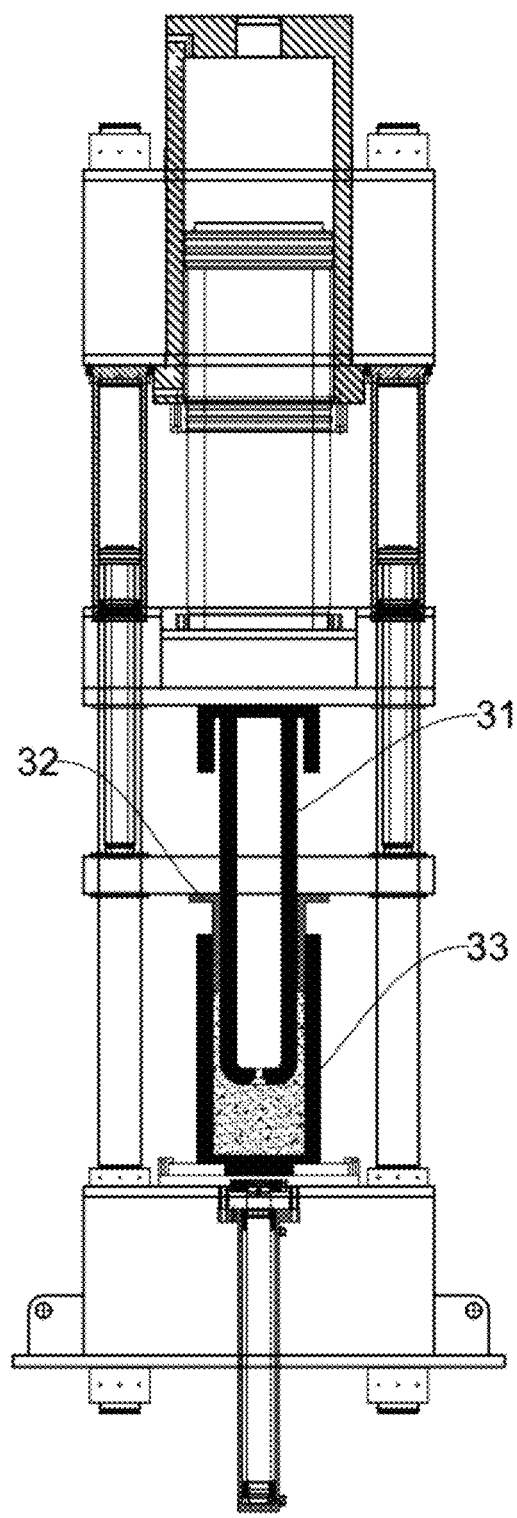

Referring to FIG. 14C, the first hydraulic cylinder 11 continues to drive the male die 31 to move downward, and the pressure of the male die 31 is gradually increased. The second hydraulic cylinders 21 continue to drive the crucible mouth pressing member 32 to move downward, and the pressure of the crucible mouth pressing member 32 is gradually reduced. The crucible paste 60 is squeezed by the male die 31 and turned up to squeeze the crucible mouth pressing member 32, and the crucible mouth pressing member 32 will move upward with the extrusion of the crucible paste 60. With the downward pressure of the first hydraulic cylinder 11, the crucible paste 60 in the female die 33 is squeezed and turned up. At the same time, the crucible mouth pressing member 32 blocks the upward turning of the crucible paste 60 in parallel, so that the original free and disorderly upturn is changed into a controlled, regular and orderly upturn under the intervention of certain external forces. With the upturn of the crucible paste 60, frictional resistance of the crucible paste 60 gradually increases, therefore, the output pressure of the first hydraulic cylinder 11 needs to be gradually increased, and the output pressure of the second hydraulic cylinders 21 needs to be gradually reduced, so that the pressure on the crucible paste 60 is in a stable state, so as to achieve even density of the graphite crucible, improve intensity and oxidation resistance of the graphite crucible, and further improve the service life of the graphite crucible.

In an implementation method of the embodiment, when the crucible paste 60 squeezes the crucible mouth pressing member 32 upward under the pressure of the male die 31, the crucible mouth pressing member 32 is squeezed to move in the direction away from the base 41, and the second displacement controller 222 can detect the displacement distance of the crucible mouth pressing member 32. The characterization of performance of the crucible paste has always been a difficult problem for the carbon industry, and it plays a crucial role in the performance and stability of carbon products. The performance of paste is closely related to its formula, particle size distribution, and temperature, and is usually judged by technical personnel's experience, which cannot be quantitatively characterized. Through the displacement distance of the crucible mouth pressing member 32, the performance of the crucible paste can be reflected, the greater the displacement distance, the better the plasticity of the crucible paste. By setting the second displacement controller 222, the plasticity of the crucible paste can be measured, and the plastic state of the crucible paste can be automatically recorded in the production process, so that the plasticity of the crucible paste in production can be changed from traditional sensibility to measurable data, providing a basis for the digitalization and intelligence of the carbon industry, which is of epoch-making significance and will certainly promote the crucible forming and even the improvement of the technological level of the special carbon industry.

Figure 14D:
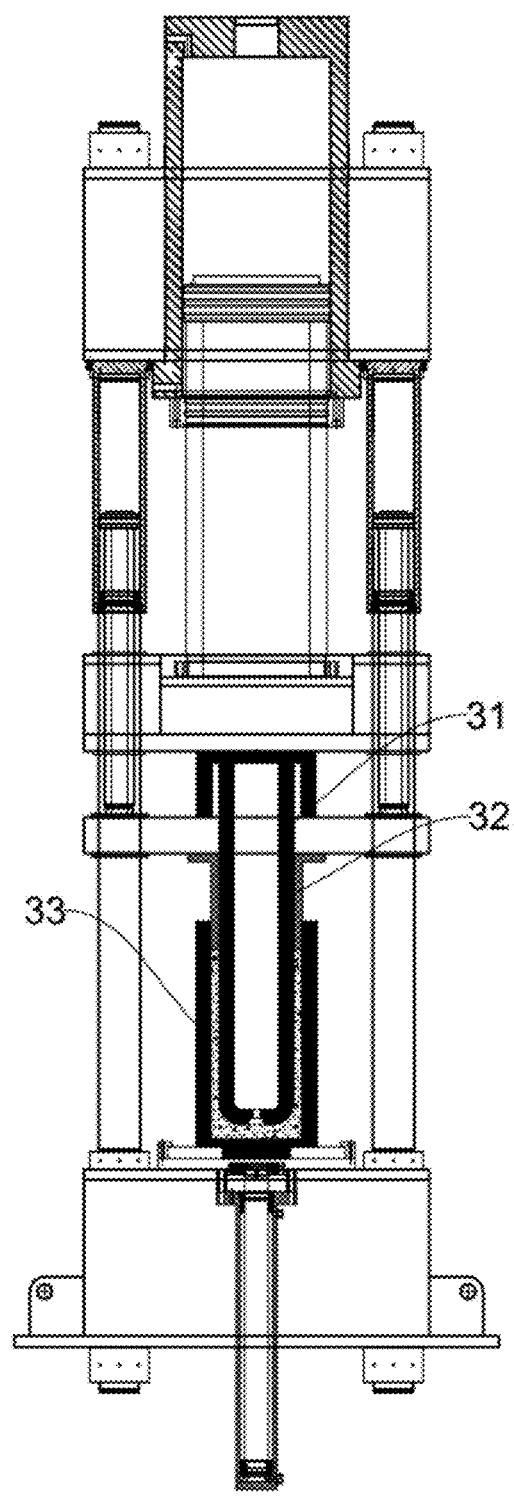

Referring to FIG. 14D, When the crucible paste 60 is turned in place, the first hydraulic cylinder 11 drives the male die 31 to move downward to the first limit position, and the first limit position is configured to limit the thickness of the bottom of the graphite crucible. The second hydraulic cylinders 21 drive the crucible mouth pressing member 32 to move upward to the second limit height at the same time, and the second limit height is higher than the reference height of the graphite crucible. The first hydraulic cylinder 11 reduces the pressure of the male die 31 and keeps the position of the male die 31 unchanged, and the second hydraulic cylinders 21 increase the pressure of the crucible mouth pressing member 32 and drive the crucible mouth pressing member 32 to slowly move down to the third limiting position, and the third limiting position is configured to limit the reference height of the graphite crucible. The first hydraulic cylinder 11 and the second hydraulic cylinders 21 increase the pressure of the male die 31 and the crucible mouth pressing member 32, and keep the pressure unchanged, thereby forming the crucible mouth. Through the settings of the male die 31 and the crucible mouth pressing member 32, the crucible mouth is subjected to secondary pressure, which achieves the precise control of the height of the crucible, and improves the density of the crucible mouth, so as to improve the intensity of the crucible mouth of the graphite crucible, reduce the possibility of cracking at the crucible mouth, and further improve the service life of the graphite crucible.

Figure 14E:
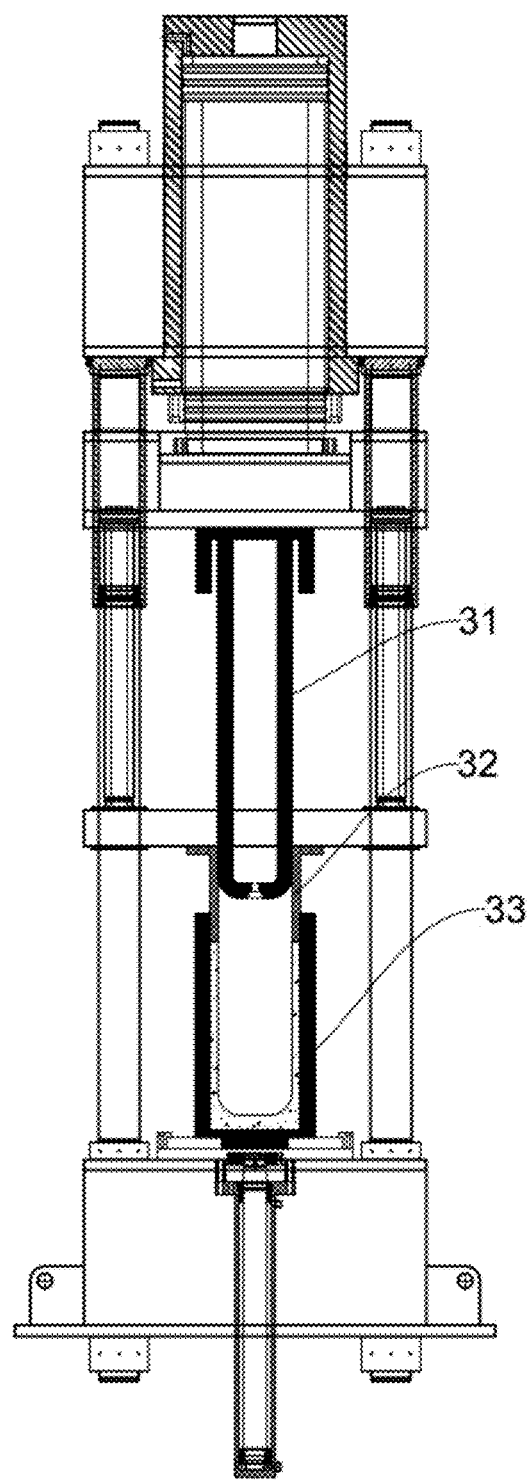
Figure 14F:
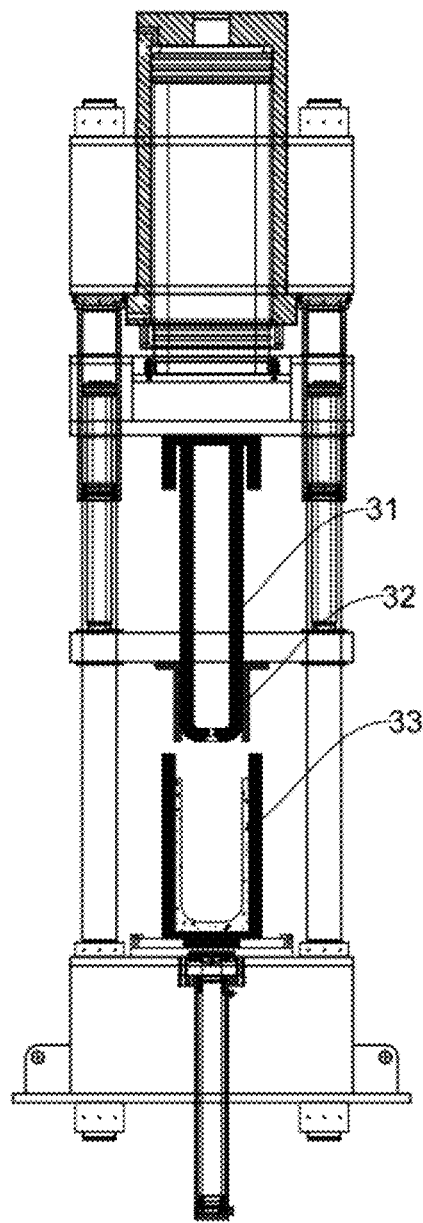

Referring to FIG. 14E and FIG. 14F, after the first hydraulic cylinder 11 and the second hydraulic cylinders 21 maintain pressure for the preset duration, the first hydraulic cylinder 11 and the second hydraulic cylinders 21 release the pressure of the male die 31 and the crucible mouth pressing member 32 synchronously. The position of the crucible mouth pressing member 32 remains unchanged, the first hydraulic cylinder 11 drives the male die 31 to slowly retract to the initial position in the direction away from the female die 33, and the second hydraulic cylinders 21 drive the crucible mouth pressing member 32 to slowly retract to the initial position in the direction away from the female die 33, thereby achieving demolding. When the male die 31 is demolded, the crucible mouth pressing member 32 can hold against the crucible mouth, at the same time, the first hydraulic cylinder 11 releases the pressure and applies an upward pulling force equivalent to its own weight in reverse, which can prevent the graphite crucible from being damaged when the male die 31 is pulled out, thereby improving the yield of graphite crucible forming.

The moving platform 50 can remove the formed graphite crucible and the female die 33 from the forming station (i.e., the position of the base 41 corresponding to the male die 31), and at the same time, another set of the female die 31 added with the crucible paste 60 of the setting weight is placed on the forming station. The above preparation steps are cycled to prepare a new graphite crucible.

During preparing the graphite crucible, the first displacement controller 122 and the second displacement controller 222 are used to control the displacement distances of the male die 31 and the crucible mouth pressing member 32, so as to precisely control the height and the bottom thickness of the crucible, so that the height and the thickness of the crucible are more controllable, the size of the formed crucible is more precise, and the preparation process is simple and the operation is convenient.

At present, most of the crucible forming methods in the related art adopt hydraulic reverse extrusion forming method. The crucible prepared by the hydraulic reverse extrusion forming method has a normal volumetric density of 1.72 $g/cm^3$, but during the reverse extrusion forming process, the paste is freely turned up under the pressure of the pressure head, and the volumetric density of the crucible gradually decreases from 1.72 $g/cm^3$ at the bottom of the crucible to below 1.68 $g/cm^3$ at the crucible mouth, resulting in cracking from the crucible mouth during use, and resulting in the crucible being scrapped. The service life of the crucible is generally around 4 times. At the same time, in order to increase the loading capacity of graphitization and maximize the volume of the crucible, the diameter of the crucible is getting larger and larger, the height of the crucible is getting higher and higher, while the wall thickness is getting thinner and thinner, resulting in a sharp decrease in the quality of the upper part of the crucible. In order to ensure the yield and service life of the crucible, the process difficulty is increasing, which hinders the improvement of crucible quality and service life.

The graphite crucible prepared by the forming device of the graphite crucible 100 provided in the embodiment not only improves the density of the graphite crucible, but also fundamentally solves the problem of uneven density of the graphite crucible. The density of the graphite crucible body prepared by the forming device of the graphite crucible 100 provided in the embodiment can reach 1.72 g/cm³, and it is consistent from top to bottom of the graphite crucible. The service life of the graphite crucible has been increased from traditional 3-4 times to 6-8 times. Under current circumstances, each set of the graphite crucible can generate a net profit of over 300 CNY.

In summary, the forming device of the graphite crucible 100 of the embodiment makes the crucible paste 60 to form the graphite crucible through the cooperation of the male die 31, the crucible mouth pressing member 32 and the female die 33. Through the settings of the crucible mouth pressing member 32, the crucible mouth pressing member 32 and the male die 31 synchronously perform constant pressure forward extrusion on the crucible paste, which may effectively improve a density of the graphite crucible, and ensure uniformity of the density, so as to improve overall intensity and oxidation resistance of the graphite crucible, to further improve service life of the graphite crucible. Moreover, during preparing the graphite crucible, the crucible mouth pressing member 32 maintains pressure on the crucible mouth at all times, so that the density of the graphite crucible is increased, and the upper and lower densities of the graphite crucible are uniform, which improves the oxidation resistance performance of the graphite crucible, and reduces weak areas in the graphite crucible, thereby achieving the improvement of the overall performance of the graphite crucible.

Furthermore, it can be understood that the aforementioned embodiments are only illustrative of the disclosure, and the technical solutions of each embodiment can be arbitrarily combined and used in combination on the premise that the technical features are not conflicting, the structure is not contradictory, and the purpose of the disclosure is not violated.

Finally, it should be noted that the above embodiments are only used to illustrate the technical solutions of the disclosure, but not to limit it. Although the disclosure has been described in detail with reference to the foregoing embodiments, those skilled in the art should understand that it is still possible to modify the technical solutions described in the foregoing embodiments, or to replace some technical features with equivalents. However, these modifications or substitutions do not make the essence of the corresponding technical solutions deviate from the spirit and scope of the technical solutions of various embodiments of the disclosure.

What is claimed is:

1. A forming device of a graphite crucible, comprising:
a support frame, comprising a base and upright columns;
a male die, disposed on the support frame and far away from the base; wherein the male die is movable reciprocally in a vertical direction relative to the support frame;
a crucible mouth pressing member, disposed on the support frame and correspondingly disposed on a side of the male die close to the base; wherein the crucible mouth pressing member is movable reciprocally in the vertical direction relative to the support frame, and the crucible mouth pressing member defines an opening part allowing the male die to pass therethrough;
a female die, disposed on the base and corresponding to the male die; wherein the female die is configured to accommodate crucible paste, and the male die, the crucible mouth pressing member and the female die are configured to cooperatively form the crucible paste into the graphite crucible;
a first driving assembly, comprising a first hydraulic cylinder and a first sliding beam; wherein the first hydraulic cylinder is disposed on the support frame and connected to the first sliding beam; and the first sliding beam is slidably connected to the upright columns, the male die is fixedly connected to a side of the first sliding beam close to the base, and the first hydraulic cylinder is configured to drive the first sliding beam to move reciprocally in the vertical direction; and
a second driving assembly, comprising a second hydraulic cylinder and a second sliding beam; wherein the second hydraulic cylinder is disposed on the support frame and connected to the second sliding beam; the second sliding beam is disposed on the side of the first sliding beam close to the base and slidably connected to the upright columns; and the crucible mouth pressing member is fixedly connected to a side of the second sliding beam close to the base, and the second hydraulic cylinder is configured to drive the second sliding beam to move reciprocally in the vertical direction.

2. The forming device of the graphite crucible as claimed in claim 1, wherein the second sliding beam defines a male die avoidance hole, the male die avoidance hole is disposed corresponding to the male die, and the crucible mouth pressing member is disposed corresponding to the male die avoidance hole and on the side of the second sliding beam close to the base.

3. The forming device of the graphite crucible as claimed in claim 1, wherein the second hydraulic cylinder is two in quantity, the two second hydraulic cylinders are symmetrically disposed on two sides of the first hydraulic cylinder and respectively connected to two ends of the second sliding beam through piston rods.

4. The forming device of the graphite crucible as claimed in claim 1, wherein the first sliding beam and the second sliding beam each define connecting through-holes, the connecting through-holes are sleeved on the upright columns, and the first sliding beam and the second sliding beam are slidably connected to the upright columns through the connecting through-holes.

5. The forming device of the graphite crucible as claimed in claim 4, wherein each of the connecting through-holes is provided with a guide sliding sleeve therein, the guide sliding sleeve is compatible with each of the upright columns, an inner sidewall of the guide sliding sleeve defines a lubrication groove, and a dust ring is disposed in the lubrication groove.

6. The forming device of the graphite crucible as claimed in claim 1, further comprising:
a first displacement controller, disposed on the first sliding beam and configured to control a displacement distance of the male die; and
a second displacement controller, disposed on the second sliding beam and configured to control a displacement distance of the crucible mouth pressing member.

7. The forming device of the graphite crucible as claimed in claim 6, wherein the second displacement controller is configured to further detect a displacement distance of the crucible mouth pressing member being squeezed by the crucible paste to move along a direction away from the base, to thereby detect performance of the crucible paste.

8. A preparation method of a graphite crucible, comprising:

adding crucible paste with a setting weight into a female die;

moving a male die and a crucible mouth pressing member to approach the female die in a vertical direction to squeeze the crucible paste to thereby form the graphite crucible; and moving the male die and the crucible mouth pressing member along a direction away from the female die in the vertical direction to perform demolding;

wherein the moving a male die and a crucible mouth pressing member to approach the female die in a vertical direction to squeeze the crucible paste to thereby form the graphite crucible specifically comprises:

moving the male die and the crucible mouth pressing member towards the female die synchronously to thereby squeeze the crucible paste, so that the crucible paste is subjected to constant pressure for a preset duration; and continuing to move the male die in a direction towards the base, and synchronously moving the crucible mouth pressing member in a direction away from the base, to thereby form the graphite crucible;

wherein the continuing to move the male die in a direction towards the base, and synchronously moving the crucible mouth pressing member in a direction away from the base, to thereby form the graphite crucible specifically comprises:

gradually increasing pressure of the male die, and moving the male die in the direction towards the base to a first limiting position; wherein the first limiting position is configured to limit a thickness of a bottom of the graphite crucible; and gradually reducing pressure of the crucible mouth pressing member, and synchronously moving the crucible mouth pressing member in the direction away from the base to a second limiting position;

wherein the second limiting position is higher than a reference height of the graphite crucible.

9. The preparation method of the graphite crucible as claimed in claim 8, wherein after the continuing to move the male die in a direction towards the base, and synchronously moving the crucible mouth pressing member in a direction away from the base, to thereby form the graphite crucible, the preparation method further comprises:

keeping a position of the male die unchanged, increasing the pressure of the crucible mouth pressing member, and slowly moving the crucible mouth pressing member down to a third limiting position; wherein the third limiting position is configured to limit the reference height of the graphite crucible; and keeping the pressure of the male die and the crucible mouth pressing member applied on the crucible paste unchanged for the preset duration to thereby form a crucible mouth.

\* \* \* \* \*